Aug. 23, 1938.　　　F. C. FRANK　　　2,127,725
BRAKE
Filed March 11, 1932

INVENTOR.
FREDERICK C. FRANK
BY
ATTORNEY

Patented Aug. 23, 1938

2,127,725

UNITED STATES PATENT OFFICE 2,127,725

BRAKE

Frederick C. Frank, South Bend, Ind., assignor to Bendix Aviation Corporation, South Bend, Ind., a corporation of Delaware Application March 11, 1932, Serial No. 598,252

7 Claims. (Cl. 188—18)

This invention relates to brakes and more particularly to disc brakes.

Broadly, the invention comprehends a disc brake for a wheel adaptable for low pressure tires, such as are in general use on aircraft. Wheels of this particular type have a relatively small diameter; hence, a brake associated therewith must of necessity have a correspondingly small diameter. It is, therefore, essential that the component parts of the brake be made relatively small so that they will occupy the minimum amount of space. In the present invention the brake has a sufficently small diameter to fit snugly within the confines of a flange on the wheel, preferably a tire retaining flange, and the component parts perform dual functions.

An object of the invention is to provide a brake including a relatively few parts assembled in a compact unit which may be quickly assembled and will efficiently perform its intended function.

Another object of the invention is to provide a brake structure of the disc type including a fixed member, an axially movable member and a rotatable member between fixed and axially movable members, and to so construct and arrange these parts that the fixed member may perform a plurality of functions to the end that the number of component parts may be greatly reduced.

A feature of the invention is to provide a brake structure including a combination axle shoulder, a dust shield support, and a friction element per se.

Another feature of the invention is to provide a brake structure comprising a fixed member including a friction element, a member movable axially thereon, and means carried by the fixed member for moving the axially movable member.

Another feature of the invention is a fixed member including a friction element, a member slidable on the fixed member also including a friction element, and a rotatable and axially movable member positioned between the friction element together with a means on the fixed member for moving the slidable member.

Other objects and features of the invention will appear from the following description taken in connection with the drawing, which forms a part of this specification, and in which.

Figure 1:
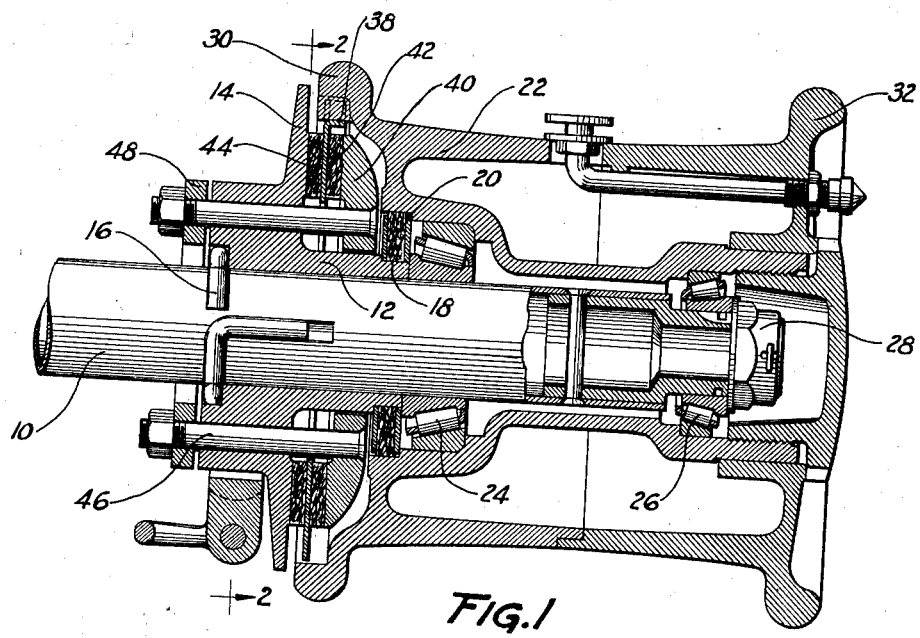
Figure 1 is a vertical sectional view of a wheel and its associated brake.
Figures 2, 3:
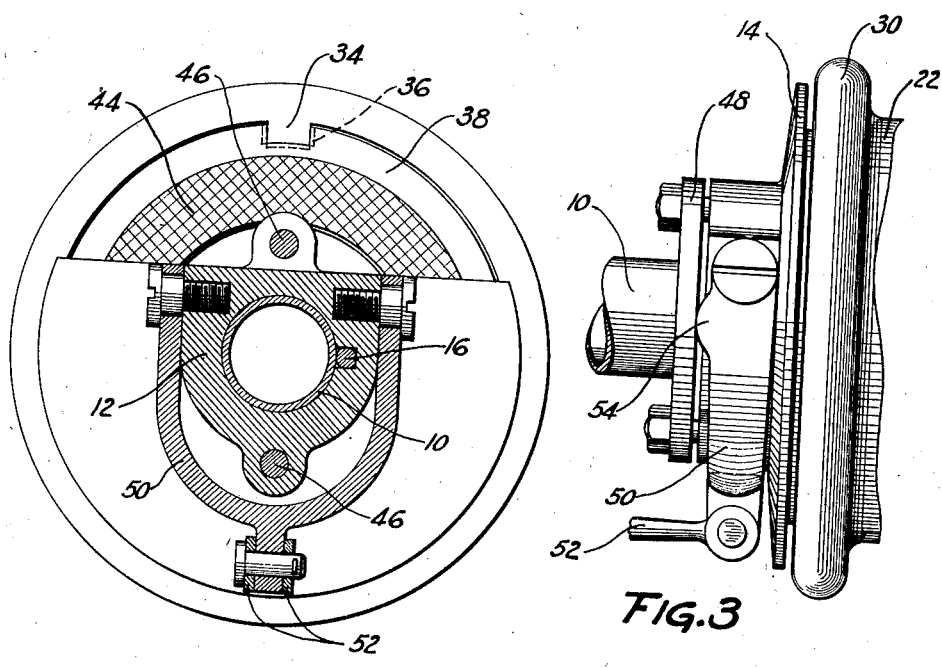
Figure 2 is a section taken on a line 2—2 Figure 1.
Figure 3 is a side elevation of a portion of a wheel and its associated brake.

Referring to the drawing for more specific details of the invention, 10 represents an axle having positioned thereon a sleeve 12 provided with a circumferential flange 14. The sleeve is secured to the axle by a suitable key 16. As shown, the key prevents rotatable and axial movement of the sleeve; thus, the sleeve provides a highly desirable collar for the axle. The sleeve also has a shoulder 18 for the reception of a grease retaining washer 20.

The axle has positioned thereon for rotation, a wheel 22 having suitable bearings 24 and 26. The bearing 24 engages the sleeve 12 and the bearing 26 is engaged by a retaining nut 28 threaded on the end of the axle. The wheel has the usual tire retaining flanges 30 and 32. The tire retaining flange 30 is provided with a plurality of radial lugs or bosses 34. These bosses extend into corresponding notches 36 in an annular friction element 38. The inter-locking relation between the lugs 34 on the tire retaining flange 30 and the notches 36 in the friction element 38 is such that the friction element 38 rotates with the wheel, and yet is free for axial movement relative thereto.

The sleeve 12 has positioned thereon for axial movement a disc 40 to which is suitably secured a friction lining 42 oppositely disposed with respect to a similar lining 44 suitably secured to flange 14. The friction linings are arranged on oppositely disposed sides of the friction element 38 and are adaptable for engagement therewith.

The axially movable member 40 is connected by a plurality of bolts 46 arranged parallel to the axis of the sleeve 12 and passing through suitable openings in the flange 14, to a ring or collar 48 engaged by a suitably operated means, such as a yoke 50 pivoted on the sleeve and connected by a rod or drag cable 52 to a suitable operated means, not shown. The yoke may be provided with cam surfaces 54 engaging the ring or collar 48.

In operation, assuming that the wheel is rotating and is carrying with it friction element 38 and that this member is rotating freely between the frictional members on the fixed element 14, and the movable element 40, force is applied to rock the yoke 50, whereupon the cams engaging the ring 48 cause axial movement of the friction element 40 toward the friction element on the flange 14, whereupon the friction element 38 is moved axially and is clamped between the frictional lining to effectively retard the rotatable movement of the wheel.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent, is:

1. A brake structure comprising a fixed member having a circumferential flange having a friction face thereon, a member having a second friction face axially movable on said fixed member, means extending longitudinally through said fixed member and secured to said axially movable member at one end, an annular thrust member secured to said means at the other end, and actuating means pivoted on said fixed member and engaging said thrust member.

2. A brake structure comprising a fixed member having a circumferential flange having a friction face thereon, a member having a second friction face axially movable on said fixed member, a rotatable axially movable member positioned between said faces, means extending longitudinally through said fixed member and secured to said axially movable member at one end, an annular thrust member secured to said means at the other end, and actuating means pivoted on said fixed member and engaging said thrust member.

3. In combination with an axle having a wheel positioned thereon for rotation, a sleeve secured on the axle providing an axle and shoulder including a circumferential flange constituting a friction element, a shoulder on the sleeve and a grease retaining washer on the sleeve and abutting said shoulder.

4. In combination with a stationary axle and a wheel positioned thereon for rotation, a friction element carried by the wheel, a sleeve positioned on the axle providing an axle shoulder for positioning said wheel, a flange formed integral with the sleeve, and a flange movable axially on the sleeve.

5. A brake structure comprising an axle, a sleeve keyed thereon providing an axle shoulder, a flange on the sleeve constituting a friction element, a disc movable axially on the sleeve, a rotatable and axially movable friction element between the flange and disc, a wheel on the axle journalled entirely on one side of said shoulder and having a splined connection with the outer periphery of the rotatable and axially movable friction element, and means for moving the disc whereby said brake forms a separable unit from the wheel, and whereby the wheel may be removed without disturbing the brake, and positively positioned relative to the brake.

6. In a brake structure the combination of a wheel having a rim and a tire retaining flange and a recess thereunder, a friction disc positioned within the confines of the flange, means connecting the disc at its periphery to the wheel for rotation therewith and for axial movement and cooperating friction means forming a wheel abutment, said wheel being journalled entirely on one side of said brake whereby said wheel may be removed without disturbing said brake and replaced in positive proper position with reference to the brake.

7. A disc brake actuator comprising a fixed collar member having a friction disc flange thereon, a yoke pivoted on said collar, an annular member adjacent said collar and adapted to be engaged by said yoke and means connected to said annular member passing through said collar member and secured to an axially movable friction disc at the other side of said collar.

FREDERICK C. FRANK.